Dec. 8, 1931.  H. H. MATHIS  1,835,416
DIRECTION SIGNAL
Filed Jan. 8, 1930  3 Sheets-Sheet 1
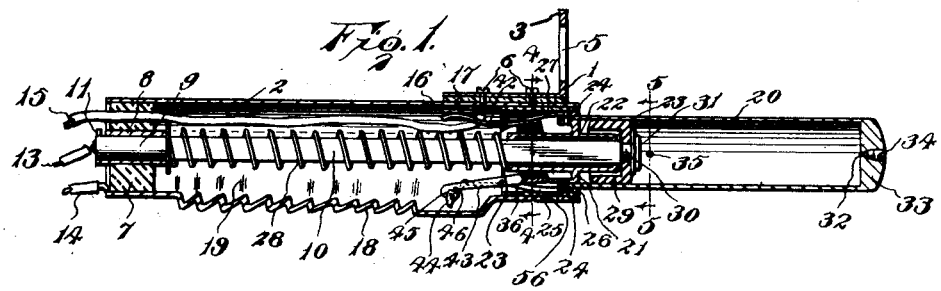
Fig. 1.
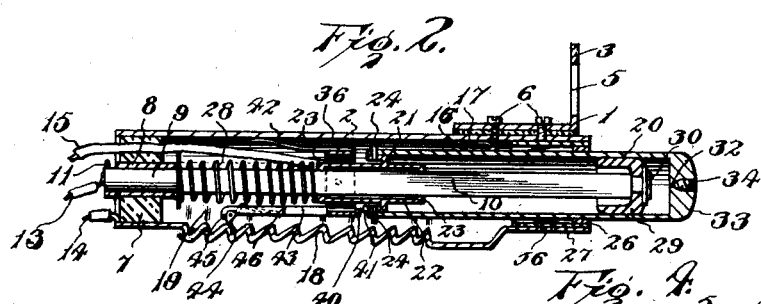
Fig. 2.
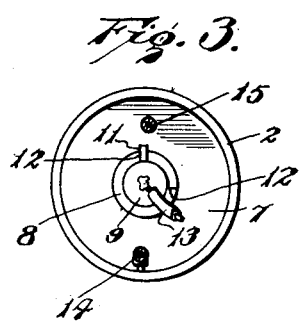
Fig. 3.
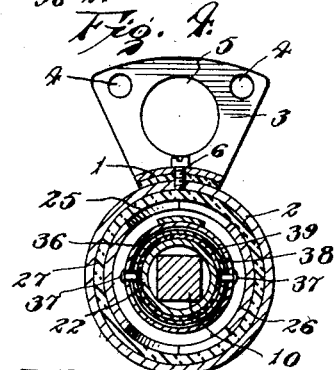
Fig. 4.
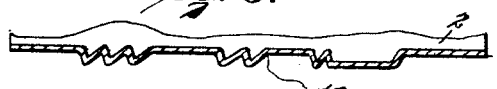
Fig. 6.
Fig. 5.
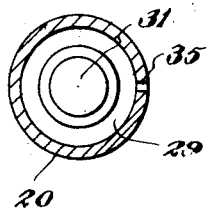
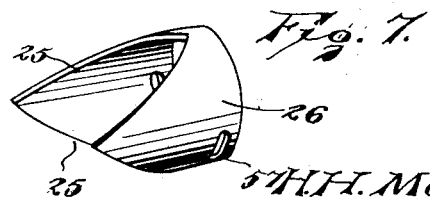
Fig. 7.
Inventor
H. H. Mathis
By Lacey & Lacey,
Attorneys.

Dec. 8, 1931.  H. H. MATHIS  1,835,416
DIRECTION SIGNAL
Filed Jan. 8, 1930  3 Sheets-Sheet 2
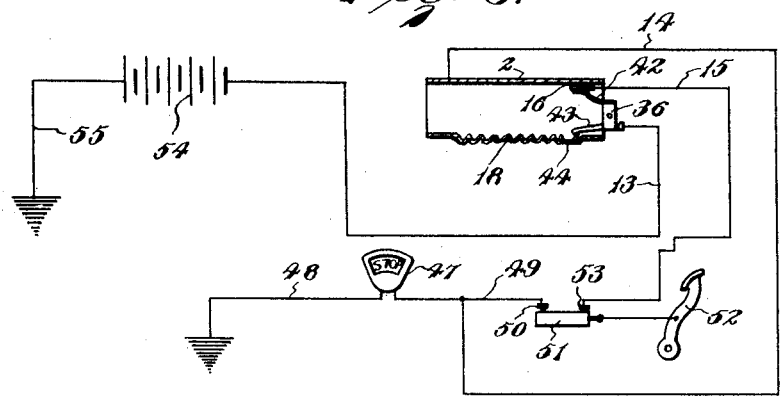
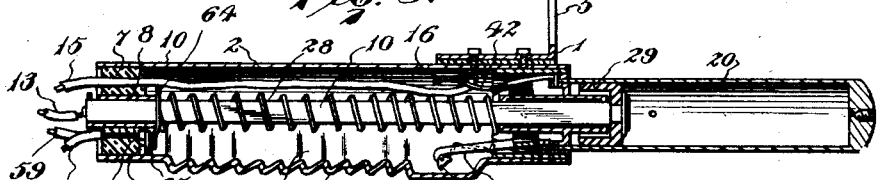
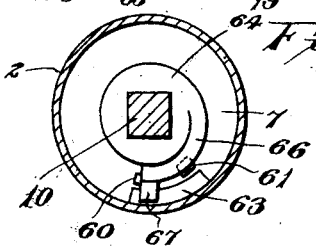
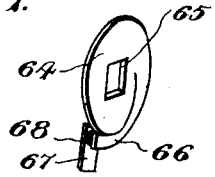
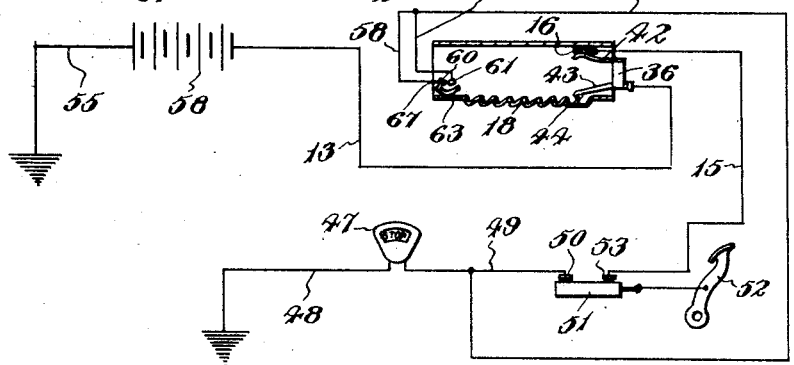
Inventor
H. H. Mathis
By Lacey & Lacey, Attorneys Dec. 8, 1931.  H. H. MATHIS  1,835,416
DIRECTION SIGNAL
Filed Jan. 8, 1930  3 Sheets-Sheet 3

Inventor
H. H. Mathis
By Lacey & Lacey, Attorneys

Patented Dec. 8, 1931

1,835,416

UNITED STATES PATENT OFFICE

HENRY H. MATHIS, OF NEW HAVEN, CONNECTICUT

DIRECTION SIGNAL

Application filed January 8, 1930. Serial No. 419,377.

This invention relates to direction signals and more particularly to a signal having means whereby a stop signal of a conventional construction or separate lights may be caused to be intermittently illuminated and indicate to the driver of an automobile at the rear of a machine equipped with the improved signal the intentions of the operator.

One object of the invention is to so form the actuating means or circuit maker and breaker as it may be termed that a bulb forming part or independent from a stop signal of a conventional construction may be intermittently energized and display either a continuous series of flashes or interrupted series of flashes and thereby call attention to the fact that a turn is to be made either to the right or left according to the manner in which the light flashes.

Another object of the invention is to so form the circuit maker and breaker that a plunger constituting part of the same may be easily forced inwardly into a tube or casing without the signal being actuated and the plunger then moved outwardly at a relatively low rate of speed during which movement the circuit will be intermittently opened and closed and a flashing light displayed.

Another object of the invention is to allow the operator of the signal to selectively cause the signal light to flash in a desired manner according to the direction in which a turn is to be made by properly operating the plunger when it is moved inwardly but cause the plunger to be normally held in position to cause one set of flashes to be displayed and return to this position as it reaches its outermost position in case it has been moved to display the second set of flashes when thrust inwardly.

Another object of the invention is to permit a pilot light to be mounted in the actuating means and energized as the plunger moves outwardly so that the driver by observing the pilot light will know whether or not the signal light is in operation and also whether or not he has displayed the signal intended.

Figure 13:
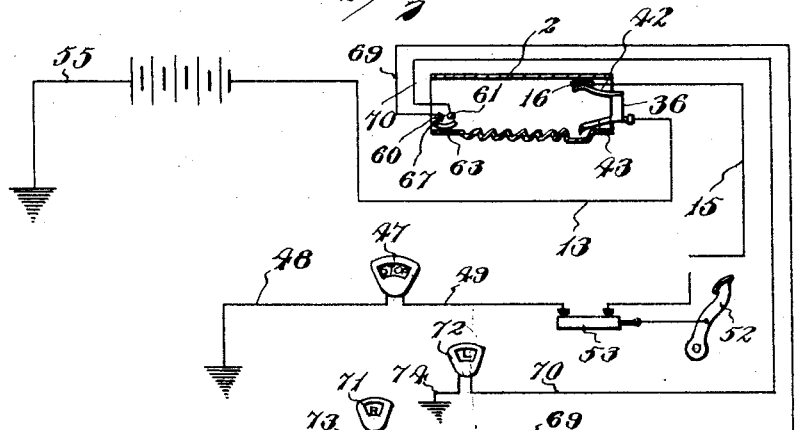
Figure 14:
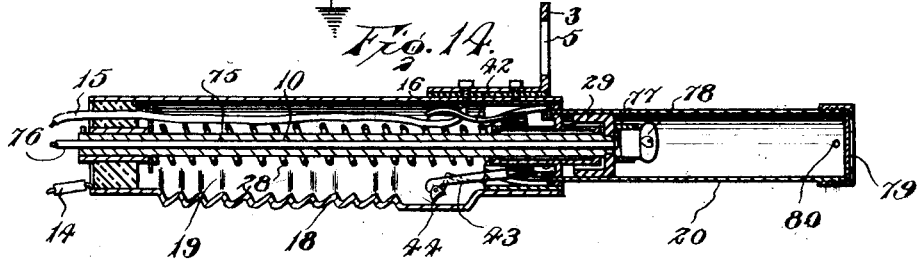
Figure 15:
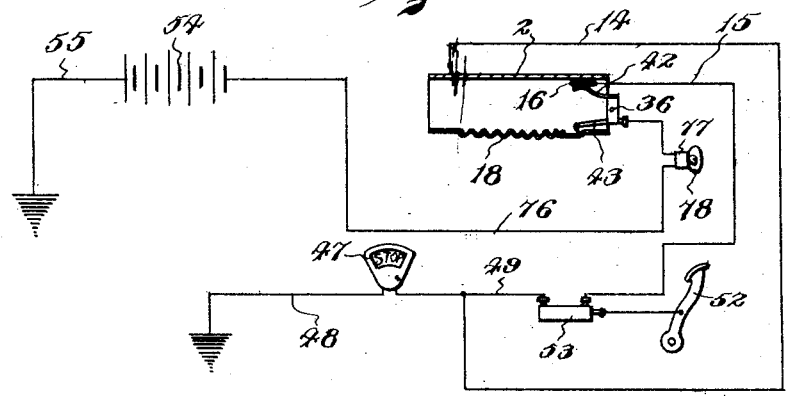

The improved signal and operating means are disclosed in the accompanying drawings, wherein Figure 1 is a longitudinal sectional view through one form of operating means when in its normal position, Fig. 2 is a longitudinal sectional view showing the plunger moved inwardly, Fig. 3 is an enlarged view in elevation looking at the inner end of the operating means, Fig. 4 is a transverse sectional view taken on the line 4—4 of Fig. 1, Fig. 5 is a sectional view taken on the line 5—5 of Fig. 1, Fig. 6 is a fragmentary longitudinal sectional view through the casing illustrating a rack by means of which a signal light may be caused to emit groups of flashes instead of flashing continuously when in operation, Fig. 7 is a perspective view of a guide which insures return of the plunger to its proper position as it moves outwardly, Fig. 8 is a diagram showing the manner in which a signal operated by the device shown in Figs. 1 and 2 is to be wired, Fig. 9 is a longitudinal sectional view through a modified form of operating means, Fig. 10 is a transverse sectional view taken on the line 10—10 of Fig. 9, Fig. 11 is a perspective view of a bridge forming part of the operating means shown in Fig. 9, Fig. 12 is a wiring diagram for a signal equipped with the operating means shown in Fig. 9, Fig. 13 is a wiring diagram for a signal having operating means constructed as shown in Fig. 9 but in which separate bulbs are employed to indicate right and left turns instead of having the bulb of the usual stop light flash, Fig. 14 is a sectional view showing a pilot light applied to an operating means constructed as disclosed in Fig. 1, and Fig. 15 is a wiring diagram similar to Fig. 8 with the pilot lght included therein.

The actuating means through the medium of which flashing of the signal light is effected may be mounted upon the instrument board, the steering column, or disposed centrally of the steering wheel in place of the usual horn button, and in the accompanying drawings, there has been shown a bracket 1 secured to the casing 2 with a portion 3 of the bracket extending transversely from the casing. This portion 3 is formed with openings 4 through which screws or equivalent fasteners may be passed and is also formed with an opening 5 so that the bracket may be secured to the hub portion of a steering wheel with the horn button projecting through this opening. Screws 6 are employed to hold the bracket in engagement with the casing, and it will be understood that the bracket may be mounted, as shown in Figs. 1 and 2, or reversed so that the portion 3 of the bracket projects from the casing intermediate its ends instead of near its outer or front end.

This casing is open at its outer end and its rear or inner end is closed by a plug 7 formed of insulating material. A bushing 8 extends through the head or closure 7 centrally thereof and through this sleeve or bushing extends the rear end portion 9 of a rod 10. The rod is rectangular in cross section throughout practically its entire length but its rear portion 9 is circular in cross section, as shown in Fig. 3. Therefore, this rod may be rotated in the bushing. A pin 11 projects from the rear end of the rod and serves to limit rotation of the rod by engagement with shoulders 12 formed by removing a portion of the bushing beyond the rear or outer end of the head 7. Wires 13 and 14 are adapted to be soldered or otherwise secured to the rod and casing at the rear or inner ends thereof and a wire 15 extends through the head into the casing with its inner end soldered or otherwise firmly secured to a contact 16. This contact is firmly secured in the casing near its outer or forward end and is insulated from the casing, as shown at 17. The casing is formed of conductive metal and one portion thereof is crimped to form a rack 18 having its teeth evenly spaced from each other longitudinally of the casing, as shown in Figs. 1 and 2. At one side of the rack 18 the casing is crimped to form a second rack 19, the teeth of which are formed in groups spaced longitudinally of the casing, as shown in Fig. 6. By this arrangement a signal light may be caused to emit a continuous series of flashes when the rack 18 is in use but when the rack 19 is in use the signal light will emit groups of flashes. This will be fully explained during the course of the following description.

A plunger 20 is slidably received in the casing through its open outer end and the inner end of the plunger is secured to a collar 21 of a sleeve 22 which fits about the rod 10 and has its end portions turned inwardly, as shown at 23, for close contacting engagement with side faces of the rod. Therefore, when the plunger is turned in the casing, the sleeve will impart turning movement to the rod until movement of the rod and plunger is stopped by engagement of the pin 11 with one of the shoulders 12. The pins 24 which connect the plunger with the collar project outwardly and are received in recesses 25 formed in a liner 26 which is firmly secured in the outer end portion of the casing but insulated therefrom by a sleeve 27. These recesses 26 taper forwardly, as clearly shown in Fig. 7 and if the plunger is turned out of its normal position, the extended portions of the pins 24 will bear against the sleeve at the sides of the recesses and return the plunger to its normal position as it moves outwardly. Therefore, when the plunger is moved outwardly by the spring 28 after being thrust inwardly to the position shown in Fig. 2, it will always be restored to its proper position. A piston 29 formed of pliable material, such as leather or rubber, is secured to the outer end of the rod by upsetting the reduced end 30 of the rod to form a retainer 31 for the piston. This piston is disposed about the rod, as shown in Figs. 1 and 2, so that the plunger may be easily thrust inwardly against the action of the spring 28 but when the plunger is moving outwardly the piston serves to retard its movement. This action is similar to that which takes place when a pump is operated for forcing air into a tire. An air passage 32 is formed in the head 33 at the outer end of the plunger and controlled by a plug or needle valve 34 and an opening 35 is formed through a side of the plunger in spaced relation to its inner end. As the plunger moves outwardly under tension of the spring 28, air seeps into the plunger through the passage 32 impeded by the valve 34. Almost at the end of the outward stroke the opening 35 is exposed between the piston and cylinder head. Air now comes swiftly into the plunger through the opening 35, thereby almost eliminating the retarding action of the piston; just when the pins 24 enter the recesses 25 and also just when the spring 42 rides upon the contact 16.

In order to make and break a circuit as the plunger moves outwardly, there has been provided a collar 36 which fits loosely about the sleeve 22 and this collar is pivotally mounted by pins 37 passed through a ring 38 which is firmly mounted about the sleeve 22 but insulated therefrom, as shown at 39. Contacts 40 and 41 are carried by the collar 36 and inner end of the plunger and in order to normally urge the collar to a tilted position in which the contact 40 engages the contact 41, there has been provided a leaf spring 42 which not only serves its purpose as a spring but also serves as a contact adapted to bear against the contact 16 when the plunger is in its extended position. An arm 43 extends inwardly from the collar and this arm carries a tooth 44 which is pivotally mounted at its free end. Pivotal movement of the tooth 44 in one direction is limited by engagement with an abutment pin 45 projecting from the arm 43 and pivotal movement in an opposite direction is yieldably resisted by a spring 46 carried by the arm. It will thus be seen that when the plunger is thrust inwardly the tooth may have pivotal movement as it passes the teeth of the rack 18 or 19 without rocking the collar against the action of the spring 42 but when the plunger moves outwardly the tooth will engage the abutment 45 and as it makes contact with the teeth of the rack rocking motion will be imparted to the collar and the contact 40 intermittently moved into and out of engagement with the contact 41. When the collar is in its outermost position, the tooth is out of engagement with the walls of the casing and a circuit will be broken thereby preventing continuous burning of the signal lamp.

When this signal operating device or circuit closer is in use, it may be employed in connection with a stop signal 47 of a conventional construction which has a ground wire 48 and a wire 49 leading therefrom. The wire 49 leads to a terminal 50 of a switch 51 having a conventional construction and adapted to be closed when the brake pedal 52 of an automobile is pressed upon to apply the brakes and to the other terminal 53 of this switch is secured the wire 15 leading from the contact 16. The wire 14 leading from the casing 2 is secured to the wire 49 between the stop signal and switch 51 and the wire 13 is connected to one side of a battery 54, the other side of which is grounded by a wire 55. When the plunger is thrust inwardly, the tooth 44 normally moves along the rack 18 but if the plunger is turned as it is moved inwardly the tooth will be disposed at the inner end of the rack 19 instead of the rack 18 when the plunger reaches its innermost position. The contact strip or spring 42 upon leaving the contact 16 bears against the casing 2 and establishes a circuit which is intermittently broken as the plunger is moved outwardly due to the fact that as the plunger moves outwardly the tooth rides over the rack teeth and in doing so causes the collar to be rocked about its pivots 37 and this causes the contact 40 to be moved away from the contact 41, as shown in Fig. 2. As the tooth 44 rides past each of the rack teeth, the spring returns the collar to its normal position in which the contact 40 engages the contact 41 and when this takes place, the current passes from the wire 13 through the rod 10 and sleeve 22 and by way of the contacts 41 and 40 through the collar 36 and spring strip 42 to the casing from which it passes by way of the wire 14 to the wire 49 and through the stop signal to the ground by way of the wire 48. Therefore, the stop signal will emit a series of flashes which are either continuous or in spaced groups according to whether the tooth 44 is moving along the rack 18 or the rack 19. It will thus be seen that the stop light will first be practically continuously lighted as the plunger is moved inwardly to display a warning signal and then as the plunger moves outwardly at a relatively slow rate of speed a series of flashes or a series of groups of flashes will be displayed and indicate either a right or a left hand turn. As the plunger approaches its outermost position, the pins 24 projecting from opposite sides thereof enter the recesses 25 of the guide 26 and if the plunger has been turned in order to dispose the tooth 44 in engagement with the teeth of the rack 19, a cam action will be set up which will rotate the plunger and stem and restore the plunger to its normal position. A slot 56 is formed through the casing and the insulation 27 through which a sheet of emery paper or thin file may be passed and the guide is formed with a similar slot 57 which registers with the slot 56. These slots are so disposed that when the plunger is in its outermost position the contacts 40 and 41 will be disposed opposite the slots. Therefore, the strip of emery paper or thin file may be passed between these contacts and the contacts cleaned when necessary. If it is intended to stop without making a turn, the operator of the automobile presses upon the brake pedal in the usual manner but does not push the plunger inwardly. When this takes place, the current passes from the collar 36 through the contact 16 by way of the spring 42 and through the wire 15 to the switch 51 and since this switch is closed when the brake pedal is pressed upon the stop signal will be lighted in the usual manner. It will thus be seen that the stop signal may serve its usual function of indicating that an automobile is going to stop and may also be employed as a direction signal to indicate that a turn is to be made and also the direction in which the automobile is about to turn.

In Figures 9 through 12, there has been shown a modified form of the invention. In this form, the actuating means or circuit closer is in most parts similar in construction to that illustrated in Figures 1 and 2 and, therefore, corresponding parts are designated by the same reference numerals. Instead of having the wire 14 secured to the casing 2 of the circuit maker and breaker, it is provided with branches 58 and 59 which are passed through the block of insulating material 7 and are secured to terminals 60 and 61 embedded in the inner face thereof.

These terminals are spaced from each other and also spaced from the sleeve or bushing 8 and are disposed at one side of but adjacent opposite ends of an elongated contact 63 which bears against the casing, as shown in Figure 10. The disk 64 of conductive metal against which the inner end of the spring 28 bears is formed with a rectangular opening 65 through which the rod 10 passes and this disk of resilient metal is cut to form a spring strip 66 disposed in overlying relation to the terminals or contacts 60 and 61. A contact or bridging strip 67 is fixed to the spring strip 66 and insulated therefrom, as shown at 68, and since the disk or washer 64 turns with the rod 10 the bridging strip 67 may be disposed to establish connection either between the contacts 60 and 63 or the contacts 61 and 63. When the bridging strip is in engagement with the contact 60, the tooth 44 will be disposed for engagement with the teeth of the rack 18 but when the plunger is turned as it is moved inwardly to dispose the tooth 44 at the inner end of the rack 19 the contact 63 will be connected with the contact 61. By this arrangement it will be impossible for an improper flashing of the stop light to take place as the plunger must be in its proper position in order to allow the bridging strip to connect the contact 63 with the desired contact 60 or 61.

Instead of depending upon the stop light to serve as a direction signal, wires 69 and 70 which take the place of the wire 14 and its branches 58 and 59 are led from the contacts 60 and 61 and these wires are connected to signals 71 and 72 each of which includes a bulb to be lighted when the signal is in operation. The signals 71 and 72 are grounded, as shown at 73 and 74 and it is preferred to have the bulbs of different colors in order to more clearly distinguish between them. When this embodiment of the invention is in use, inward movement of the plunger will cause one of the signals 71 and 72 to be first lighted practically continuous as the plunger is moved inwardly and then intermittently lighted as the plunger moves outwardly, and it will be understood that which signal has its bulb lighted will be controlled according to whether or not the plunger is turned as it is moved inwardly.

In Figure 14, there has been shown a further modified form of the invention wherein a pilot light will be illuminated at the same time the signal is displayed and thereby allow the driver of the automobile to be sure that the signal is in operation and also sure that he has displayed the proper signal. This pilot light may be embodied in an actuating device constructed either as shown in Figures 1 and 2 or as shown in Figure 9 but it has been illustrated in connection with an actuating device constructed as shown in Figures 1 and 2. Referring to Figure 14, it will be seen that the rod 10 instead of being solid is formed with an axially extending passage or bore 75 through which extends a wire 76 corresponding to the wire 13. At its inner end the wire 76 is secured to the center contact by a socket 77 grounded to the head 31 of the rod and in this socket is mounted a bulb 78. The outer end of the plunger is provided with a transparent head 79 so that the operator of the automobile can see the bulb and the air passage 80 at the outer end of the plunger is formed through a side thereof near its head instead of through the head. The operation is the same as previously described, except that when the plunger is pressed inwardly and then moved outwardly the bulb 78 will be energized as well as the direction signal or stop signal. Therefore, there will be no danger of the driver of the automobile not being aware of the fact that the signal is not working properly or that he has incorrectly operated the device.

Having thus described the invention, I claim:

1. A signal operating device comprising a casing of conductive material, teeth spaced from each other longitudinally of said casing, a plunger slidable longitudinally of said casing and yieldably held against inward movement, a contact carried by said plunger, and a contact insulated from said plunger and moved into and out of engagement with the contact of the plunger by said teeth whereby a circuit may be intermittently closed as the plunger moves.

2. A signal operating device comprising a casing, teeth spaced from each other longitudinally of said casing, a plunger slidable longitudinally in said casing, means yieldably holding said plunger in an extended position, means to retard outward movement of said plunger after being forced inwardly, a stationary contact carried by said plunger, and a contact insulated from said plunger and moved into and out of engagement with the contact of the plunger by said teeth.

3. A signal operating device comprising a casing, teeth spaced from each other longitudinally of said casing, a rod extending axially of said casing, a plunger slidable longitudinally in said casing about said rod, a piston carried by said rod within said plunger to retard outward movement of the plunger, a spring yieldably resisting inward movement of said plunger, a stationary contact carried by said plunger, a contact movably connected with said plunger and moved by said teeth as the plunger moves to intermittently close a circuit, and means to establish electrical connection between the plunger and casing.

4. A signal operating device comprising a casing open at one end, a plunger slidable into and out of said casing through the open end thereof, a rod extending through said casing and projecting from the open end thereof, a hollow plunger slidable into and out of said casing about said rod, a spring coiled about said rod and engaging the inner end of said plunger to yieldably resist inward movement thereof, a piston carried by said rod within said plunger to retard outward movement of the plunger by said spring, teeth spaced from each other longitudinally of said casing, a stationary contact carried by said plunger, and a contact movably connected with said plunger and moved to engage the stationary contact by the teeth of the casing as the plunger moves.

5. A signal operating device comprising a casing open at one end, a plunger slidable into and out of said casing through the open end thereof, a rod extending through said casing and projecting from the open end thereof, a hollow plunger slidable into and out of said casing about said rod, a spring coiled about said rod and engaging the inner end of said plunger to yieldably resist inward movement thereof, a piston carried by said rod within said plunger to retard outward movement of the plunger by said spring, the walls of said casing being crimped to form teeth spaced from each other longitudinally of the casing, a stationary contact carried by said plunger, and a contact movably connected with said plunger and moved to engage the stationary contact by the teeth of the casing as the plunger moves.

6. A signal operating device comprising a casing open at one end, a plunger slidable into and out of said casing through the open end thereof, a rod extending through said casing and projecting from the open end thereof, a hollow plunger slidable into and out of said casing about said rod, a spring coiled about said rod and engaging the inner end of said plunger to yieldably resist inward movement thereof, a piston carried by said rod within said plunger to retard outward movement of the plunger by said spring, the walls of said casing being crimped to form racks spaced from each other transversely of the casing and one having a continuous series of teeth and the other having interrupted teeth, a stationary contact carried by said plunger, and a movable contact connected with said plunger and moved to engage the stationary contacts by said teeth when the plunger is moved longitudinally in said casing, said plunger being rotatable in the casing for actuation of its movable contact by teeth of a selected rack.

7. A signal operating device comprising a casing of conductive material open at one end, a head of insulating material closing the other end of said casing, a rod carried by said head and extending through said casing, a hollow plunger slidable into and out of said casing through the open end thereof and closed at its outer end, a piston carried by said rod and fitting in said plunger to check outward movement of the plunger, a sleeve fitting about said rod and secured to the inner end of said plunger, a spring in said casing bearing against said sleeve and yieldably resisting inward movement of said plunger, said casing being crimped to form sets of longitudinally spaced teeth, one set of teeth being spaced from the other transversely of the casing, movable and stationary contacts carried by said sleeve, said plunger being rotatable in the casing whereby the movable contact may be moved into engagement with the stationary contact by teeth of a selected one of said sets when the plunger is moved longitudinally, and means to rotate said plunger as it moves outwardly and return the plunger to a normal position.

8. A signal operating device comprising a casing of conductive material open at one end, a head of insulating material closing the other end of said casing, a rod carried by said head and extending through said casing, a hollow plunger slidable into and out of said casing through the open end thereof and closed at its outer end, a piston carried by said rod and fitting in said plunger to check outward movement of the plunger, a sleeve fitting about said rod and secured to the inner end of said plunger, a spring in said casing bearing against said sleeve and yieldably resisting inward movement of said plunger, said casing being crimped to form sets of longitudinally spaced teeth, one set of teeth being spaced from the other transversely of the casing, movable and stationary contacts carried by said sleeve, said plunger being rotatable in the casing whereby the movable contact may be moved into engagement with the stationary contact by teeth of a selected one of said sets when the plunger is moved longitudinally, a guide in said casing having recesses leading from its inner end and tapered outwardly, and pins extending transversely from said plunger to engage in said recesses and rotate the plunger to its initial position as the plunger moves outwardly.

9. A signal operating device comprising a casing of conductive material open at one end, a head of insulating material closing the other end of said casing, a rod carried by said head and extending through said casing, a hollow plunger slidable into and out of said casing through the open end thereof and closed at its outer end, a piston carried by said rod and fitting in said plunger to check outward movement of the plunger, a sleeve fitting about said rod and secured to the inner end of said plunger, a spring in said casing bearing against said sleeve and yieldably resisting inward movement of said plunger, said casing being crimped to form rack teeth, a collar fitting about said sleeve in insulated relation thereto and pivotally mounted, an arm extending from said collar, a tooth pivoted to said arm and adapted to move from one tooth of said casing to another as the plunger slides through the casing and rock the collar, and a spring yieldably holding said collar in a normal position with a portion thereof in contact with said sleeve to establish electrical connection between the sleeve and collar and adapted to bear against the casing and electrically connect the casing with the sleeve.

10. A signal operating device comprising a casing of conductive material open at one end, a head of insulating material closing the other end of said casing, a rod carried by said head and extending through said casing, a hollow plunger slidable into and out of said casing through the open end thereof and closed at its outer end, a piston carried by said rod and fitting in said plunger to check outward movement of the plunger, a sleeve fitting about said rod and secured to the inner end of said plunger, a spring in said casing bearing against said sleeve and yieldably resisting inward movement of said plunger, said casing being crimped to form rack teeth, a collar fitting about said sleeve in insulated relation thereto and pivotally mounted, an arm extending from said collar, a tooth pivoted to said arm and adapted to move from one tooth of said casing to another as the plunger slides through the casing and rock the collar, a spring yieldably holding said collar in a normal position with a portion thereof in contact with said sleeve to establish electrical connection between the sleeve and collar and adapted to bear against the casing and electrically connect the casing with the sleeve, a contact carried by said casing and seated in the head of insulating material, terminals seated in the head of insulating material, and a bridge to connect the contact of said casing with a selected terminal.

11. A signal operating device comprising a casing of conductive material open at one end, a head of insulating material closing the other end of said casing, a rod carried by said head and extending through said casing, a hollow plunger slidable into and out of said casing through the open end thereof and closed at its outer end, a piston carried by said rod and fitting in said plunger to check outward movement of the plunger, a sleeve fitting about said rod and secured to the inner end of said plunger, a spring in said casing bearing against said sleeve and yieldably resisting inward movement of said plunger, said casing being crimped to form rack teeth, a collar fitting about said sleeve in insulated relation thereto and pivotally mounted, an arm extending from said collar, a tooth pivoted to said arm and adapted to move from one tooth of said casing to another as the plunger slides through the casing and rock the collar, a spring yieldably holding said collar in a normal position with a portion thereof in contact with said sleeve to establish electrical connection between the sleeve and collar and adapted to bear against the casing and electrically connect the casing with the sleeve, and a terminal insulated from said casing and engageable by the last-mentioned spring.

12. A signal operating device comprising an element movable first in one direction and then in an opposite direction to its original position, a stationary contact carried by said element, a mounting pivoted to said element and insulated therefrom, contacts carried by said mounting and element, means yieldably holding said mounting in a normal position with the contacts in engagement, and means to rock said mounting and intermittently separate said contacts as said element moves.

In testimony whereof I affix my signature.

HENRY H. MATHIS. [L. S.]